2,796,760

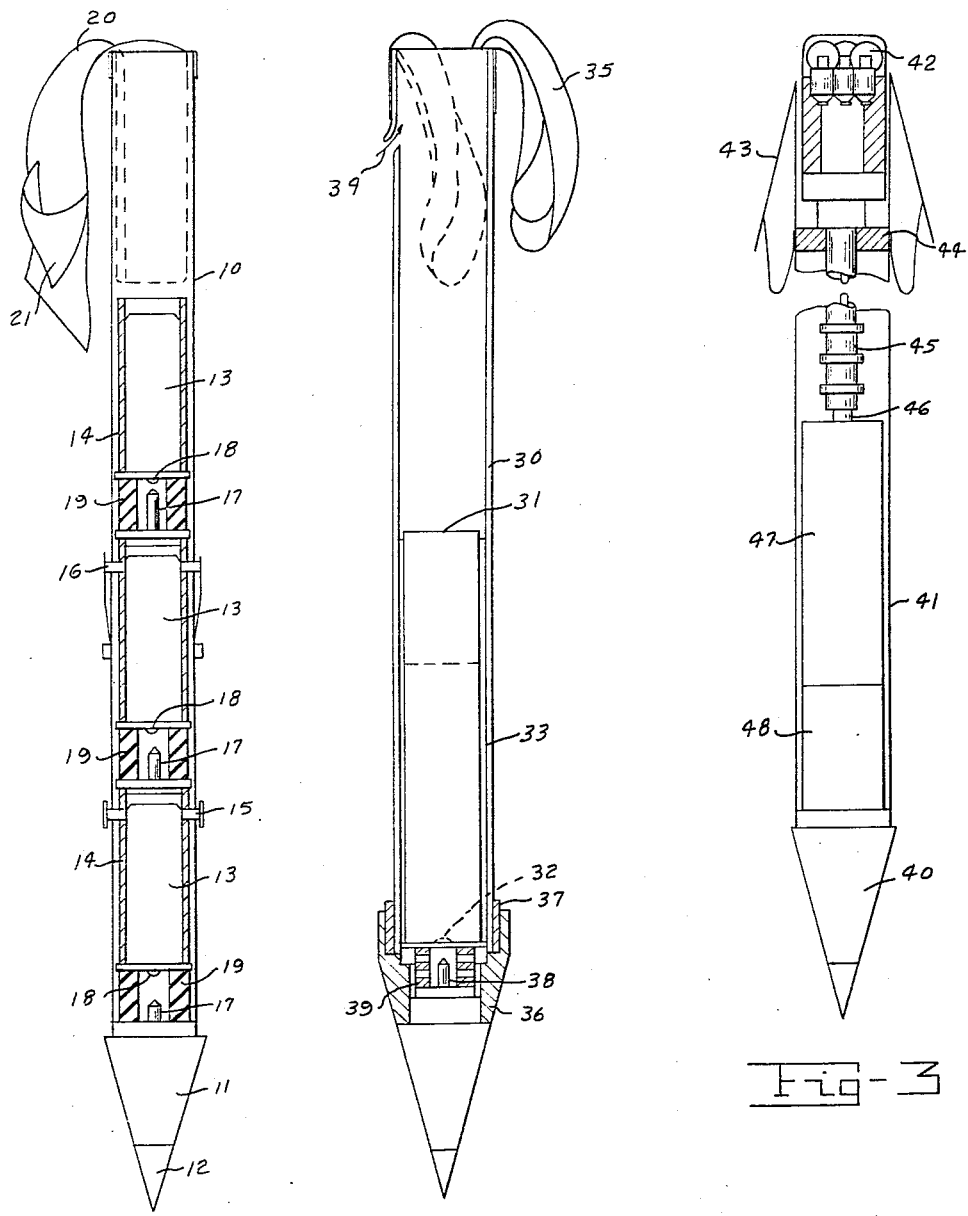

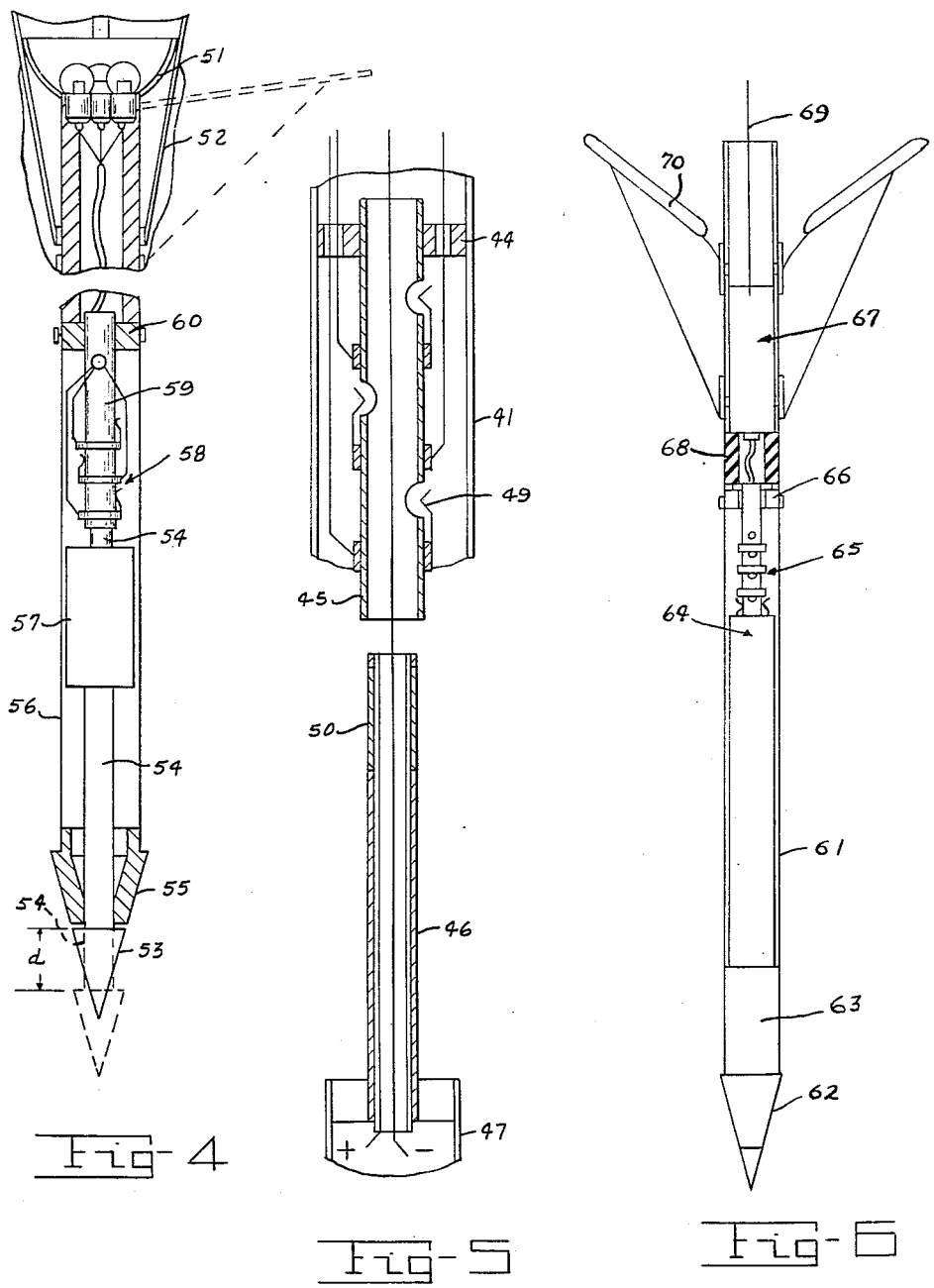

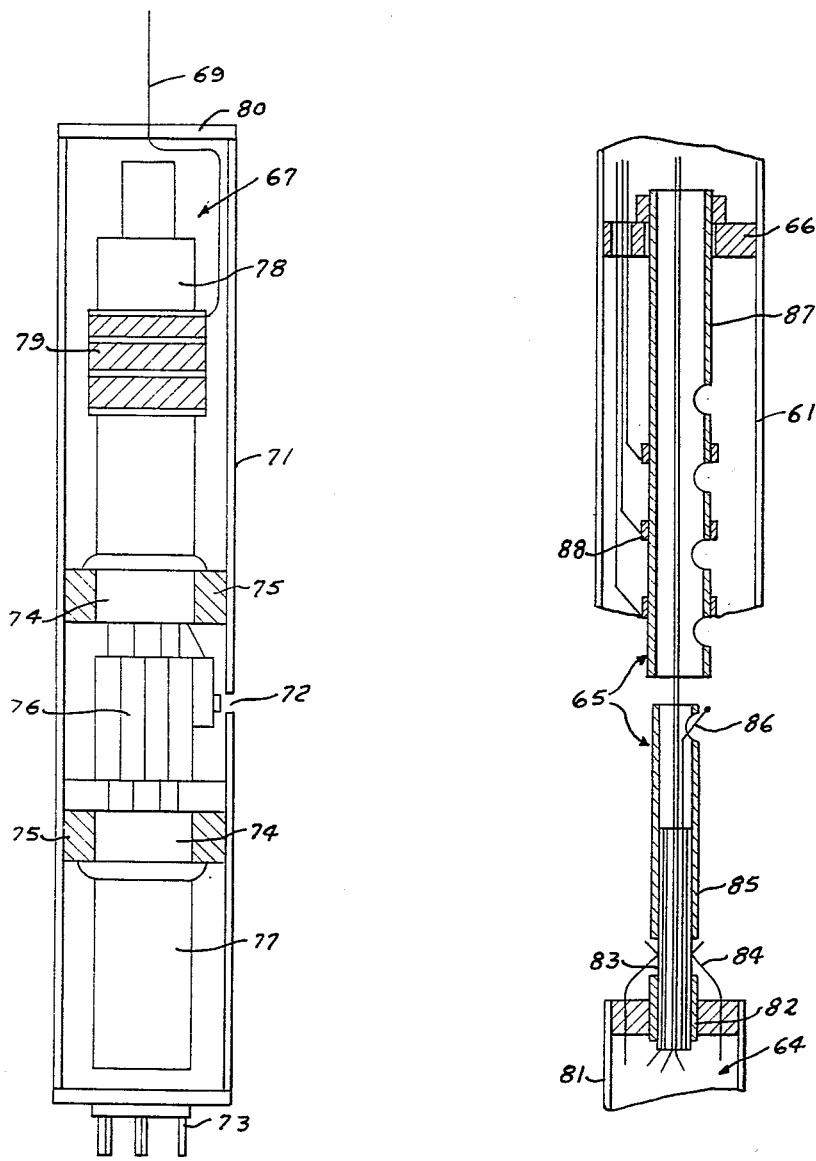

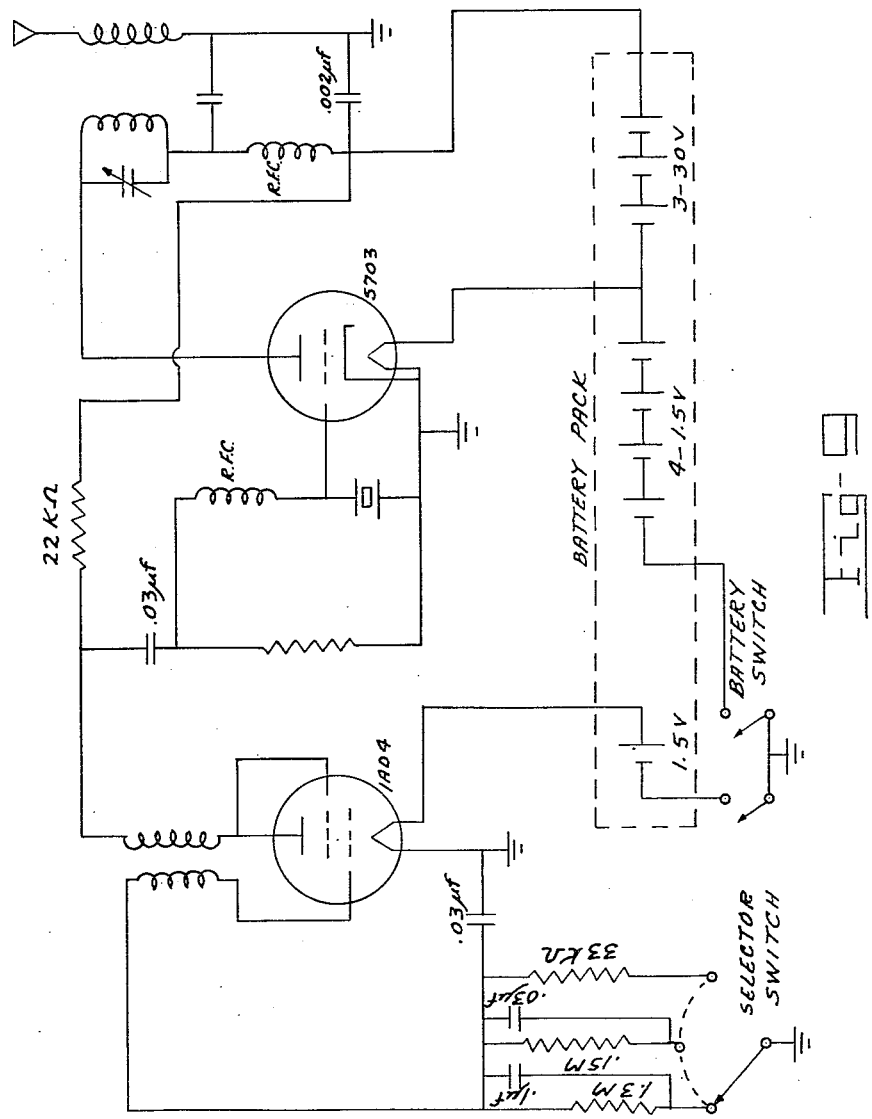

DROP PENETROMETER

Arpad A. Warlam, Hastings on Hudson, N. Y., assignor to the United States of America as represented by the Secretary of the Air Force Application February 20, 1956, Serial No. 566,742

12 Claims. (Cl. 73—32)

This invention relates to apparatus for determining ground hardness or consistency by remote operation. More particularly, this invention relates to penetrometers adapted for airborne use which are capable of transmitting a signal that informs a remotely positioned observer of the ground consistency. The apparatus referred to herein as a "drop penetrometer," thereby characterizing its manner of use, is especially important in situations where direct physical contact with the ground is not possible or feasible.

These are numerous types of situations wherein the information regarding the condition of the ground involving particularly unfamiliar terrain is of utmost importance as, for example, in determining (a) the traffic carrying ability of the natural ground surface for vehicles of different types, (b) suitability of a given site for beach landing, (c) whether adequate support exists for aircraft landing or take-off, (d) suitable areas for parachuting personnel or equipment conducive to minimum risk of injury or damage by breakage. Other situations include snow and ice surveys, exploration of ground covered by water or snow, soil erosion studies and many other applications.

Heretofore, information on the trafficability and related aspects pertinent to ground consistency has been made available by virtue of measurements made by direct physical contact as by the use of manual penetrometers which consist essentially of a probing element or the like which can be manually or mechanically driven into the ground. The force or pressure required for penetration of the probing element is generally registered in some manner as by an appropriate scale and the necessary data are thereby made directly available to the operator. The Army Engineers' manual cone penetrometer has been found to be quite satisfactory for measuring the consistency of accessible ground and the information utilized in terms of "cone index" values has proven to be of considerable significance in both military and general applications of the indicated types.

Where the ground is not directly accessible, the manual penetrometer obviously cannot be utilized. Nevertheless, useful information may be derived from the interpretation of airphotos involving an examination of topographic features, drainage pattern, vegetative cover, tracks of vehicles, bomb craters and other aspects of importance. Sometimes the soil type can also be identified and its probable consistency estimated from antecedent meterological factors. The accuracy of this estimate, however, is not always sufficient to warrant reasonably definite conclusions regarding soil trafficability as, for example, concerning which type of vehicle can pass and which cannot along a specific route previously unclassified as to its vehicle supporting characteristics.

It has now been discovered that adequate information can be derived by mechanical measurement of ground consistency through the use of an airborne ground testing device adapted for launching from aircraft or by other suitable means, said device being adapted to penetrate the ground to a depth dependent upon the resistance provided by the ground in accordance with its relative hardness or softness. By use of the drop penetrometer, areas not conveniently accessible can be readily evaluated for trafficability or other related purposes, the ground consistency information being made available to an observer in a remote position by various signalling means carried by the device which are either actuated or released by the impact force encountered by the drop penetrometer upon contact with the ground.

It has been further found that several types of drop penetrometers may be used satisfactorily as airborne ground testing instruments for remote operational use, one type operating on the "force of impact principle" and another type involving a "penetration movement principle." In the former, the intensity of impact is used to actuate or operate a signal whereas in the latter, the depth of penetration is utilized for activating the signal whereby the ground consistency may be classified.

In the first type designated above, the drop penetrometer comprises a tubular shell provided with a pointed nose to facilitate ground penetration and tail vanes to stabilize the unit in the air during its descent and also influence its terminal velocity. Upon hitting the ground, the resulting transient increase in its weight is utilized for compressing or otherwise deforming one or more impact gaging elements positioned within the shell. Since the force of impact has been found to vary directly with the cone index as established by manual penetrometers, the gaging element or elements may be calibrated to correspond with predetermined cone index values, and the signal or signals are released or actuated accordingly.

The second type of drop penetrometer utilizing the penetration movement principle is of similar construction excepting that an inner cone that moves independently of the outer cone upon impact is incorporated in the ground penetrating member of the device virtually forming a penetrometer within a penetrometer. The weight distribution between the inner and outer cones is such that upon hitting the ground, a differential penetration results operating a depth gage which functions to actuate one or more signals indicating the consistency of the soil penetrated by the device.

The signalling mechanisms actuated either by the force of impact or by the differential penetration for indicating the ground consistency to a distant observer may be of various types including either momentary or persistent signals which are either visual or audible thereby being suitable for daylight or after dark operations. Flares, lamps, radio transmission, dyes, balloons among others including single or multiple signals may be used as signalling means, the suitability of each type being determined primarily by the specific purpose and conditions under which the drop penetrometer is to be used. Good visibility is required for all, for example, excepting the radio signalling means which are audible on the radio receiver. In addition to hearing or observing the signal, photographic recording may also be used for providing a permanent record of the results in some cases wherein the type of signal is suitable for the purpose.

For classification purposes when it is desired to draw contour lines of areas whose trafficability is rated as impassable, poor, fair, good and excellent, the multiple signal penetrometers are preferable. A single signal penetrometer on the other hand, may be quite adequate in other situations as, for example, when it becomes necessary to determine whether or not sufficient support exists for sustaining the weight of a particular type of vehicle or aircraft or any other specific trafficability requirement. In the latter situation a single signal type calibrated for actuation when the minimum ground consistency requirement is met is quite satisfactory particularly for use in emergency situations.

For launching the drop penetrometer, various methods may be used including ejection from a plane by hand or with the aid of a wind-pipe or it may be shot from a gun. The use of compressed air guns or firearms such as a Very pistol enables launching of the penetrometer for ground to ground use, and also serves to accelerate the penetrometer where advantageous as, for example, when launching from fast planes is involved.

It is a principal object of this invention to provide a new and novel penetrometer for airborne usage enabling rapid evaluation of ground consistency by signals to a distant observer.

It is another object of this invention to provide a new and novel penetrometer referred to herein as a drop penetrometer for launching from aircraft, the same being adapted to penetrate the ground and emit one or more signals indicating the ground consistency to a distant observer whereby the physical condition of the terrain may be rapidly evaluated for trafficability or related purposes.

A further object is to provide a drop penetrometer that is compact, light in weight and readily adaptable for use under various conditions including day or night operation.

Another object is to provide a drop penetrometer actuated by either an impact or depth gage mechanism that may be calibrated to actuate a visible or audible signal indicating a ground consistency corresponding directly to cone index values as determined by conventional manual penetrometers.

Other objects and advantages will become apparent as this specification proceeds.

The invention will be more particularly described with reference to the illustrative embodiments thereof shown in the accompanying drawings in which:

Fig. 1 is a view of a multiple signal drop penetrometer partly in section to more clearly show the structural details.

Fig. 2 is an elevational view partly in section of another embodiment illustrating a single signal type.

Fig. 3 is an elevational view of a different embodiment utilizing lamp signalling means.

Fig. 4 is an elevational view of an embodiment partly in section, the dotted lines illustrating the operation of the depth gage type of mechanism.

Fig. 5 is a sectional view of part of a lamp penetrometer with the stationary and moving parts separated showing the selector switch details.

Fig. 6 is an elevational view of a radio signal transmitting penetrometer.

Fig. 7 is an elevational view partly in section showing details of a crystal-controlled telemetering transmitter.

Fig. 8 is a sectional view showing the selector and battery switch details suitable for operation of the radio penetrometer, the stationary and moving parts being separated to more clearly show the signal actuating mechanism.

Fig. 9 is a circuit diagram for the crystal-controlled telemetering transmitter and related components enabling its operation in connection with drop penetrometer applications.

It will be readily apparent that many widely varying embodiments utilizing the present inventive concept may be designed. The preferred embodiment in any given case is determined primarily by the type of information desired and also by operational requirements affecting the selection of the type of signal, weight and size limitations, velocity, production costs, and safety factors involved in shipping, handling and launching.

Referring now to the drawings illustrating a few representative types of drop penetrometers found to be suitable for use, Fig. 1 shows the structural details of a stacked flare drop penetrometer operating on the force of impact principle and constructed so that none, one, two or three signal flares are ejected from the device depending upon the severity of landing impact, thus enabling the classification of the soil into four consistency groups, i. e., for example, very soft soil with a cone index (CI) of less than 25, soft soil with CI of 25 to 50, firm soil with CI of 50 to 100 of hard soil with CI greater than 100. With the use of this embodiment the signalling system may be adjusted such that no flare is discharged when the soil CI is less than 25.

In Fig. 1, the penetrometer shell 10 forming an elongated hollow cylindrical chamber is preferably constructed of thin walled aluminum tubing although for improving aerial stability the top half of the aluminum tube may be replaced by a substantially lighter substance such as a paper-base Bakelite tube. A tapered ground penetrating member 11 hollowed to reduce weight and preferably containing a bronze tip 12 is fitted to the bottom end of the shell. Although various types of penetrating members such as spikes and the like may be used, a 30° conical aluminum point has been found to be quite satisfactory for general use, the bronze tip being suitable for minimizing distortion upon impact.

The embodiment shown in Fig. 1 utilizes as a signal means three differently colored standard 25 mm. flare cartridges 13 contained within suitable retainers 14 and supported by two pairs of shelves 15 and 16 respectively. One suitable arrangement consists of a pair of bolts 15 positioned substantially as shown to support the center flare and allow the passage of the bottom flare upon discharge, the top pair of shelves consisting of spring loaded catches 16 for supporting the top flare and adapted for opening to permit the passage of the lower flares.

Firing pins 17 which are of different length being preferably of adjustable type for setting to desired length are mounted below the flare cartridge in alignment with the detonator cap 18 at the bottom of each flare, the distances between the points of the pins and the detonating caps progressively increasing for each unit from top to bottom. Separating and supporting each flare is an impact gage 19 consisting either of resilient impact ring fabricated of rubber or soft plastic such as Vinylite or Tygon. For low temperature use which results in hardening such materials thereby impairing the compressibility characteristics thereof, metal springs such as steel coil springs having the desired supporting and compression characteristics may be substituted therefor. Shear pins may also be used in lieu of either a resilient impact ring or a metal spring, the shear value of the pin being utilized to determine the impact force at which firing pin 17 will be permitted to contact detonator 18 for actuating the flare.

When the penetrometer strikes very soft soil (CI<25), the transient increase in the weight of the flares is small, and the depression of the resilient impact ring or spring is insufficient for providing contact between the pins and the detonating caps. Hence, the flares remain in the shell and no signal is obtained. In soft but trafficable soil (CI 25–50) the impact pulls the flares down low enough for a strike by the top firing pin. The top flare is then shot out rising to a height of about 300 feet while burning for about seven seconds to provide a bright light, the color of which is determined by the positioning sequence of the individually colored flares within the shell. By way of a specific illustration, a red flare may be fired first as indicated above and, in the event firm soil (CI 50–100) is encountered the transient force depresses sufficiently for firing two flares, namely, the top red and middle yellow leaving the bottom flare which may be green within the shell. In hard soil (CI>100) the impact of landing is so severe that all the firing pins are driven into the detonators, and all three flares are shot out burning in red, yellow and green colors.

Various types of streamers or tail vanes may be used for providing aerial stability and also for controlling the velocity of the penetrometer during its descent. In the embodiment shown in Fig. 1, a streamer 20 is attached to the top of shell 10 provided with a pair of pockets 21 near the free end thereof. The streamer is tucked inside the shell except for the pockets and when released from a plane, the pockets fill with air, pull out the ribbon and develop an intensive flutter limiting the velocity of the penetrometer. With a penetrometer having a length of 2.3 feet and weighing approximately one pound, a silk ribbon streamer with a pair of 3 inch pockets limits the velocity of the penetrometer to about 100 feet per second. The streamer may be replaced by tail vanes either of the horizontal, vertical or diagonal type or tail fins preferably of the type that fold in storage and open upon launching and induce axial rotation of the penetrometer during its descent as well as limiting its velocity.

The embodiment shown in Fig. 2 referred to herein as a "parachute flare penetrometer" is quite similar to the previously described flare penetrometer. Its construction includes shell 30 providing an elongated cylindrical chamber within which a single flare cartridge 31 of the standard parachute type (25 mm.) equipped with detonator 32 is positioned by means of sleeve 33. Vent 34 near the upper end of the shell enables the passage of air therethrough serving to operate stabilizer air brake 35 in this case consisting of a pair of nylon ribbon loops that cause spinning of the penetrometer in flight. The bottom end of shell 30 is equipped with cone 36 fitted thereon by means of a spacer ring 37 of suitable size. Firing pin 38 supported in an upright position within cone 36 directly below detonator 32 is separated from the latter by an impact spring 39 or any other suitable gaging element of the types previously described. As in the multiple flare penetrometer, the landing impact temporarily increases the weight of the components supported by the gaging element in proportion to the shock that varies with soil consistency compressing the gaging element. If the shock is of sufficient intensity, the spring is compressed to a degree whereby the cartridge strikes the firing pin which sets off the detonating cap, exploding the gun powder charge and shooting the signal flare out of the chamber. The parachute flare burns for about 30 seconds, and its visibility is excellent even in bright daylight. If desired, more than one parachute flare may be used providing a multiple flare signal penetrometer.

The usefulness of a single signal type penetrometer may be understood more clearly by reference to a specific situation by way of illustration. If a small aircraft requires a minimum CI of 80 for safe landing, the pilot need not be concerned with a whole range of trafficability properties of the field on which he intends to land. All he needs to know is whether or not the CI of the field is at least 80. As the firing pin of the single flare penetrometer can be adjusted to any value of CI, it is adjusted to 80 for use in conjunction with this particular plane. If after dropping several of the penetrometers on the field a positive signal is consistently obtained, then landing on wheels may be feasible. If however, no signals issue or if they are erratic indicating soft and hard spots, the indication is that landing should not be attempted if a choice is available.

Figs. 3 and 4 illustrate the use of lamps as signal means the actuation of which is dependent upon the force of impact principle in the embodiment shown in Fig. 3 whereas the operation of the penetrometer signal of the device shown in Fig. 4 utilizes the penetration movement principle. Drop penetrometers using bulbs or lamps as signalling devices are referred to herein as lamp penetrometers.

The lamp penetrometer shown in Fig. 3 comprises cone 40 affixed to the bottom end of penetrometer shell 41. At the upper end thereof are positioned three bulbs 42 which are preferably of different colors as, for example, red, yellow and green. The air brake and stabilizer 43 may be of any suitable type and in this embodiment is shown as folded tail vanes tied down at the blade tips. The blades adapted for opening upon release, induce rapid rotation and limit the velocity of the penetrometer. Fixedly positioned within shell 41 by means of collar 44 is the stationary part of a 3-way switch consisting of a hollow tube 45. A hollow plunger 46 slidably movable within tube 45 and forming the movable part of the selector switch is attached to battery pack 47 which is likewise movable within the chamber provided by shell 41. By supporting the movable components namely, battery pack 47 and plunger 46 attached thereto upon an impact gage acting as a shock absorber, shown in the drawing as resilient impact ring 48 and suitably made of sponge rubber, a signal actuating means is provided responsive to the impact shock resulting in the movement of plunger 46. A suitable contact provided on the movable part of the selector switch can thus be adapted for closing the circuit and operating the lamps; the switch actuation depending upon the compression force on the impact ring.

One embodiment of the selector switch components and wiring suitable for the operation of a three-lamp drop penetrometer is shown in detail in Fig. 5 wherein the stationary and moving parts are separated. Elements corresponding to the components described in connection with the embodiment shown in Fig. 3 are similarly numbered for purpose of simplicity. In Fig. 5, leaf springs 49 associated with each of the three switch positions on fixed tube 45 are adapted to establish contact with movable plunger 46 through brass contact ring 50 carried thereon thereby turning on one, two or three lamps in response to the movement and resulting position of contact ring 50 within fixed tube 45. By calibrating the compression required for actuating each of the colored bulbs to establish correspondence with predetermined CI values, the information derived from this type of device obtained either by direct observation or photography may be utilized as in the case of the multiple flare drop penetrometer previously discussed.

Another embodiment of the lamp penetrometer is shown in Fig. 4 indicating several modifications including the addition of a reflector 51 for improving the visibility of the illuminated lamps and a different type of folding tail vane 52 the operation of which upon launching of the device is shown by the dotted lines. As previously indicated, however, the two devices differ functionally in that instead of an impact force being used directly for actuating an impact gage mechanism, a differential penetration of independently moving cones is used as a depth gage mechanism for operating the signals.

In order to provide for differential penetration designated by $(d)$ in Fig. 4 which varies according to the softness of the ground, a movable inner cone 53 having a hollow tubular stem 54 affixed thereto extending through a fixed outer cone 55 attached to shell 56 is provided. Supported on stem 54 is battery pack 57 above which the sliding stem continues serving as the movable part of a contact switch 58, the outer tubular element 59 of which is held in a stationary position within the shell chamber by collar 60. Any suitable wiring arrangement substantially as shown in Figs. 4 and 5 may be used for connecting the bulbs, switch positions and batteries.

Under conditions of actual use, good results were obtained with a three lamp penetrometer of the differential depth type having an overall length of about two feet and weight of about 1.1 pounds; the weight distribution being such that approximately one-half is supported on the inner cone having a cone area that is only one quarter of the total cone area. The intensity of pressure upon landing is accordingly about four times as high on the soil under the cone than under the shell. Thus the cone will drive into the soil deeper than the shell and the inner cone accordingly separates from the outer cone. In hard soil the difference in depth $(d)$ is small and in soft soil it is relatively large. The depth gage mechanism, as previously indicated, slides the movable part of the contact switch thereby establishing electrical contact illuminating one or more of the lights corresponding to the actual displacement produced upon impact.

As radio signalling is superior to visual methods under certain conditions of operation such as poor visibility, drop penetrometers having a sufficiently small and light transmitter of either the low or high frequency type were constructed, an embodiment of which is illustrated by Figs. 6 through 9. This type of drop penetrometer referred to herein as a radio or telemetering penetrometer is adapted for sending out signals capable of being heard on a plane receiver as steady sounds of low, medium or high pitch indicating soft, medium or hard ground, the specific signal being selected by an impact operated switch.

With reference to Fig. 6, the structure of the radio penetrometer shown therein includes shell 61 having cone 62 affixed to its one end. Located above the cone within the shell chamber is impact gage 63 preferably consisting of a rubber cushion for insulating battery pack 64 positioned thereover as well as measuring the impact by its compression. A selector and battery switch unit 65 operated by the downward movement of the battery pack upon landing is supported by collar 66 which also provides support for transmitter unit 67 mounted on an insulating cushion 68 preferably consisting of sponge rubber. Antenna 69 extends from the transmitter to the outside of the penetrometer shell substantially as shown.

Folding vanes 70 are attached with clock spring strips sliding freely over the shell, and being mounted with a diagonal offset commence rapid spinning that spreads them wide open. It is not necessary to tie down the blade tips as shown in the embodiment in Fig. 6 since sufficient lateral stiffness may be obtained by centrifugal force alone. The free vanes are not unlike an engine governor while subjected to the balancing effects of the centrifugal force that tends to spread the blades and the relative wind that tends to unfold them.

In order for the penetrometer signal to be received on the liaison type receiver used in military aircraft, a low frequency transmitter operating in the range of 4 to 8 megacycles per second is particularly desirable. An illustrative embodiment designated as unit 67 in Fig. 6 is shown in detail in Fig. 7 illustrating the construction of a low frequency transmitter. An advantage of this transmitter is that it is crystal controlled to provide a very high degree of frequency stability. Telemetering is performed by a blocking oscillator and modulation is accomplished by having the output of the blocking oscillator interrupt the operation of a crystal controlled power oscillator which uses a subminiature tube as indicated in Fig. 9.

It will be understood that transmitters of different construction may be used including high frequency types consisting essentially of a blocking oscillator and a power oscillator, the blocking oscillator transducing the penetrometer measurements into audio impulses which frequency modulate the radio frequency carrier generated by the power oscillator.

With reference to Fig. 7, the low frequency transmitter assembly shown therein is fitted in a plastic tube 71 of about 1 1/16" diameter and a length of 10 3/4" having an aperture 72 in its side through which the trimmer condenser may be tuned. Plug connection 73 at the bottom of the plastic tube provides for attachment of the transmitter assembly to the penetrometer switch and battery power supply. Sockets 74 positioned within tube 71 by cork bushings 75 are axially aligned and directly connected by connecting components 76 consisting of a trimmer condenser, coupling resistor, coupling condenser and by-pass condensers. Blocking oscillator unit 77 positioned below the connecting components contains subminiature tube (type 1AD4) a blocking transformer and plate by-pass condenser. The crystal oscillator unit 78 above the connecting components contains a subminiature tube (type 5703) concentrically mounted within the output tank coil and antenna coil 79, with the crystal mounted at the upper end just above the grid circuit components. The overall unit with a 3 ft. antenna 69 of hard steel wire projecting through a plastic cap 80 provided for the top end of the plastic tube weighed less than six ounces.

The low frequency transmitter circuit is shown in detail in Fig. 9. The electrical system of the radio penetrometer is not "live" during launching and descent. The impact turns on the current and simultaneously sets the signal. These functions are performed as previously indicated, by the 5-way switch shown in detail in Fig. 8 wherein the stationary and moving parts have been separated to facilitate an understanding of its construction and operation.

With reference to Fig. 8, the components discussed in connection with the embodiment shown in Fig. 6 are correspondingly numbered. Battery pack 64, the top portion of which is shown in Fig. 8, consists of a Bakelite tube 81 containing the necessary power supply furnished by ordinary 1.5 volt flashlight cells and 30 volt batteries of the type used in hearing aid devices. At the top end of tube 81 is a five prong socket 82 to which the leads from the transmitter and switch are connected. Suitable shock mountings consisting of a spring (not shown) at each end of the battery pack tube absorb shock and also insure good contact between the batteries and contact plates to which the internal leads of the pack are soldered. The battery switch comprising contact tube 83 and battery contact springs 84 is operated by the downward motion of the battery pack together with the components affixed thereto including plunger 85 and contact 86, the current being turned on when springs 84 make contact with tube 83 as shown in the figure instead of the insulator on which it normally rests.

The stationary part of the selector switch comprises hollow tube 87 over which springs 84 slide and through which plunger 85 moves axially. Tube 87 is held stationary within the shell chamber by means of collar 66. At appropriate intervals along the stationary tube, contact rings 88 are positioned with springs 89 forming individual circuits which are operable when engaging contact 86. The wires from the battery pack and the contact rings terminate in a socket into which plug 73 (Fig. 7) of the transmitter is inserted.

In operation, the assembled unit is arranged such that contact 86 within the stationary tube is above any of the signal actuating positions. Upon impact of the penetrometer with the ground, the moving plunger is pulled down by the battery pack carrying the contact therewith. The signal that is emitted from the device depends upon the impact force which accordingly establishes contact with one of the three selector switch positions.

Other types of drop penetrometers using the same basic principle may be devised for special applications as, for example, underwater exploration. In such a case, different colored dyes may be released by the striking impact, the resulting displacement causing opening the port of a compartment filled with dye. A buoyant dye container adapted for rising to the water surface and coloring it red, yellow or green to indicate a soft, intermediate or hard bottom is suitable for the purpose.

In determining the most appropriate launching method, the weight and cross-sectional area of the penetrometer and its terminal velocity and other pertinent factors affecting the ultimate impact energy must all be taken into consideration since it is generally desirable that the depth to which the penetrometer sinks even in the softest trafficable soil (cone index of about 10) not exceed two feet to avoid misleading signal results caused by reaching firm layers considerably below the ground surface. For use with fast planes or for launching from guns, it is preferred to use relatively high velocities to permit the signal to reach the observer more promptly and also to enable the penetrometer to remain nearly vertical even in moderate wind. As the depth of penetration varies with the kinetic energy, for greater velocity either the weight of the device must be decreased or its cross-sectional area needs to be increased. With some of the embodiments used, high velocities of about 200 feet per second can be attained by dropping from a minimum height of about 1,000 feet, or the penetrometer may be launched by shooting from a gun or accelerating it with a rocket positioned within the top end of the shell chamber. For firing from a Very pistol, a ballistic charge comparable to those used in the signal flares fired therefrom may be incorporated within the chamber. Velocities up to about 115 feet per second providing an impact energy of 100 foot pounds per square inch can be achieved by dropping. Since adequate penetration can be effected at or below this value for many applications of the drop penetrometer, it is not essential that ballistic or rocket provisions be included in many of the individual embodiments of the device.

While in the foregoing specification a number of specific embodiments have been set forth and various specific details have been given, it will be apparent to those skilled in the art that many of the specific embodiments and details can be varied widely without departing from the broad idea of the invention.

I claim:

1. A drop penetrometer for airborne use for indicating ground hardness by impact to a remotely positioned observer relative to the point of contact by the penetrometer with the ground, comprising a shell providing a hollow body chamber, a ground penetrating member attached to one end thereof, stabilizer means attached to the other end of the shell for orienting the penetrometer and influencing its velocity during descent, remotely determinable signalling means, at least one gaging element supporting part of the overall weight of the penetrometer within the chamber and being movably responsive to the transient force developed upon impact of the penetrating member with the ground thereby providing a limited axial displacement varying with the impact shock, and means within the chamber arranged in spaced relation with said gaging element for selectively operating the signalling means in response to the axial displacement of said gaging element.

2. A drop penetrometer for airborne use for indicating ground hardness by impact to a remotely positioned observer relative to the point of contact by the penetrometer with the ground, comprising a shell providing a hollow body chamber, a ground penetrating member attached to one end thereof, stabilizer means attached to the other end of the shell for orienting the penetrometer and influencing its velocity during descent, remotely determinable signalling means supported by the shell, at least one impact gaging element positioned within the chamber supporting part of the overall weight of the penetrometer, said element being yieldingly responsive to the impact force to provide a limited axial displacement thereof relative to its position before impact, and movable contact means arranged in spaced relation with said impact gaging element for selectively actuating the signalling means in response to the axial displacement of said impact gaging element.

3. The device of claim 2 wherein the impact gaging element is a resilient ring.

4. The device of claim 2 wherein the impact gaging element is a coil spring.

5. A drop penetrometer for airborne use for indicating ground hardness by impact to a remotely positioned observer relative to the point of contact by the penetrometer with the ground comprising a shell providing a body chamber, a ground penetrating member on one end thereof comprising a fixedly attached outer cone supporting part of the overall weight of the device and an independently movable inner cone of less surface area supporting a substantial part of the overall weight thereby enabling differential penetration by said cones upon impact with the ground, stabilizer means attached to the other end of the shell for orienting the penetrometer and influencing its velocity during descent, remotely determinable signalling means, a power pack therefor arranged for axial movement within the chamber, a selector switch connected to said signalling means comprising a movable plunger rigidly connecting said inner cone and power pack and a stationary hollow tube positioned within the chamber above said power pack, said plunger extending into and being slidably movable within said tube responsive to the differential penetration of the cones thereby enabling selective actuation of the signalling means.

6. The device of claim 5 wherein the signalling means comprises a plurality of externally positioned lamps wired to the selector switch for selective illumination corresponding to various differential penetration positions of the outer and inner cones.

7. A drop penetrometer comprising a shell providing a body chamber, a conical ground penetrating member attached to the bottom end thereof, stabilizer means attached to the other end for orienting the penetrometer and influencing its velocity during descent, resilient means within the chamber adjacent the conical member, an axially movable power pack supported thereon, the impact stress being transmitted through the resilient means to effect vertical motion of said power pack, an impact switch comprising an outer hollow tube fixedly positioned within the chamber above the power pack said tube having at least one switch position along its length, and a contact providing plunger slidably movable within said tube responsive to the vertical displacement of the power pack supporting the plunger, and visibly positioned lamps mounted on the shell corresponding to the number of switch positions in the impact switch, said lamps being wired to the switch and power pack respectively to illuminate the same at a predetermined impact stress.

8. A drop penetrometer for airborne use for indicating ground hardness by impact to a remotely positioned observer relative to the point of contact by the penetrometer with the ground comprising a cylindrical shell providing a hollow body chamber, a conical ground penetrating member attached to one end thereof, stabilizer means attached to the other end of the shell for orienting the penetrometer and influencing its velocity during descent, at least one resilient impact gaging element positioned within the chamber said element providing a limited axial displacement upon impact of the ground penetrating member with the ground, an ejectable flare positioned within the chamber above each impact gaging element and supported thereby, and contact means comprising a detonator at the bottom of each flare and a fixedly positioned firing pin therebelow in axial alignment with and in spaced relation with said detonator for discharging the flare responsive to the axial displacement of said impact gaging element.

9. A non-retrievable drop penetrometer for airborne use for indicating ground hardness to a remotely positioned observer, comprising a cylindrical shell providing a hollow cylindrical chamber, a conical ground penetrating member attached to one end thereof, foldable tail vanes attached to the opposite end of the shell for orienting the penetrometer and influencing its velocity during descent, a resilient impact gaging element positioned within the chamber adjacent the ground penetrating member said element being compressibly responsive to the shock produced upon impact of the ground penetrating member with the ground, a flare positioned above said gaging element and supported thereby, and means for discharging said flare from the chamber comprising a detonator on the base of said flare in spaced relation with a firing pin positioned therebelow within the chamber, said means enabling contact between said detonator and firing pin at a predetermined compression of the gaging element corresponding to a selected cone index value.

10. A telemetering penetrometer for airborne use for transmitting a signal upon impact with the ground indicating ground hardness to a remotely positioned observer relative to the point of contact by the penetrometer with the ground, said observer utilizing a suitable radio receiver for pickup of the signal, comprising a cylindrical shell providing a hollow body chamber, a conical ground penetrating member attached to and enclosing one end thereof, stabilizer means attached to the other end of the shell for orienting the penetrometer and influencing its velocity during descent, a resilient gaging element within said chamber said element being compressibly responsive to the transient force developed thereon upon impact of the ground penetrating member with the ground thereby providing a limited axial displacment varying with the impact shock, an axially movable power pack positioned within the chamber and supported by said gaging element, a transmitter operating within a suitable frequency range fixedly positioned within the chamber above the power pack, an antenna for said transmitter and contact means connecting the transmitter and gaging element operable to energize the transmitter and to selectively actuate the same in response to the displacement of the gaging element upon impact 11. The device of claim 10 wherein the contact means comprises a selector switch having a stationary hollow tube positioned within the chamber and a plunger in axial alignment therewith extending into said tube and slidably movable relative thereto, responsive to the displacement of the gaging element and power pack supported thereon.

12. The device of claim 10 wherein the transmitter is of low frequency operating in the range of 4 to 8 megacycles per second.

References Cited in the file of this patent

UNITED STATES PATENTS

| | | |
|---|---|---|
| 2,477,094 | Shropshire | July 26, 1949 |
| 2,551,609 | Kohr et al. | May 8, 1951 |
| 2,592,461 | Perkins et al. | Apr. 8, 1951 |

FOREIGN PATENTS

| | | |
|---|---|---|
| 433,960 | France | Nov. 11, 1911 |